United States Patent
Url et al.

(10) Patent No.: US 11,898,514 B2
(45) Date of Patent: Feb. 13, 2024

(54) INTERNAL COMBUSTION ENGINE WITH EXHAUST GAS AFTERTREATMENT AND CONTROL OF THE NITROGEN OXIDE EMISSIONS

(71) Applicant: INNIO Jenbacher GmbH & Co OG, Jenbach (AT)

(72) Inventors: Michael Url, Neufahrn (DE); Georg Arnold, Innsbruck (AT); Herbert Kopecek, Schwaz (AT); Nikolaus Spyra, Innsbruck (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 17/868,593

(22) Filed: Jul. 19, 2022

(65) Prior Publication Data

US 2022/0403793 A1    Dec. 22, 2022

Related U.S. Application Data

(63) Continuation of application No. 17/416,499, filed as application No. PCT/AT2018/060312 on Dec. 20, 2018, now Pat. No. 11,391,231.

(51) Int. Cl.
*F02D 41/14* (2006.01)
*F02D 29/06* (2006.01)
(Continued)

(52) U.S. Cl.
CPC ......... *F02D 41/1463* (2013.01); *F02D 29/06* (2013.01); *F02D 41/1446* (2013.01);
(Continued)

(58) Field of Classification Search
CPC ...... F01N 3/0842; F01N 3/029; F01N 3/0293; F01N 3/0814; F01N 3/0871;
(Continued)

(56) References Cited

U.S. PATENT DOCUMENTS 6,351,943 B1 * 3/2002 Tagami ............... F02D 41/1403
60/276
6,684,631 B2   2/2004 Surnilla et al.
(Continued)

FOREIGN PATENT DOCUMENTS

CN   107914860 A    4/2018
DE   19926146 A1   12/2000
(Continued)

OTHER PUBLICATIONS

PCT International Preliminary Report & Written Opinion of PCT/AT2018/060312 dated Nov. 15, 2019, 11 pgs.
(Continued)

*Primary Examiner* — Binh Q Tran
(74) *Attorney, Agent, or Firm* — Fletcher Yoder, P.C.

(57) ABSTRACT

An internal combustion engine, with an engine regulating device and an exhaust gas aftertreatment device with an SCR catalytic converter for the reduction of at least one $NO_x$ component, and with a catalytic converter regulating device, wherein the engine regulating device is prescribed a target value for an $NO_x$ mean value of the $NO_x$ component of the exhaust gases, which mean value results at an outlet point of the exhaust gas aftertreatment device in relation to a predefinable time period, and the engine regulating device is configured at least in one operating mode to continuously calculate an $NO_x$ reference value for the catalytic converter regulating device with consideration of $No_x$ components which have already been emitted and the predefined target value, which reference value is selected in such a way that the predefined target value results at the outlet point of the exhaust gas aftertreatment device at the end of the predefinable time period when the calculated $NO_x$ reference value of the catalytic converter regulating device is fed as $NO_x$ setpoint value to the regulating means.

21 Claims, 6 Drawing Sheets

(51) Int. Cl.
*F01N 3/20* (2006.01)
*F01N 3/08* (2006.01)
*F01N 3/10* (2006.01)
*F01N 11/00* (2006.01)

(52) U.S. Cl.
CPC ........ *F02D 41/1475* (2013.01); *F01N 3/0814* (2013.01); *F01N 3/0871* (2013.01); *F01N 3/0885* (2013.01); *F01N 3/108* (2013.01); *F01N 3/206* (2013.01); *F01N 3/208* (2013.01); *F01N 3/2073* (2013.01); *F01N 11/007* (2013.01); *F01N 2250/12* (2013.01); *F01N 2560/026* (2013.01); *F01N 2570/14* (2013.01); *F01N 2570/18* (2013.01); *F01N 2610/02* (2013.01); *F01N 2610/1453* (2013.01); *F01N 2900/04* (2013.01); *F01N 2900/0416* (2013.01); *F01N 2900/0418* (2013.01); *F01N 2900/0422* (2013.01); *F01N 2900/08* (2013.01); *F01N 2900/1614* (2013.01); *F01N 2900/1616* (2013.01); *F01N 2900/1621* (2013.01); *F02D 2250/36* (2013.01)

(58) Field of Classification Search
CPC ........ F01N 3/0885; F01N 3/103; F01N 3/108; F01N 3/206; F01N 3/2066; F01N 3/2073; F01N 3/208; F01N 9/00; F01N 11/007; F01N 13/009; F01N 2240/04; F01N 2250/12; F01N 2560/02; F01N 2560/026; F01N 2560/06; F01N 2560/14; F01N 2570/14; F01N 2570/18; F01N 2590/10; F01N 2610/00; F01N 2610/01; F01N 2610/02; F01N 2610/03; F01N 2610/04; F01N 2610/05; F01N 2610/06; F01N 2610/102; F01N 2610/1453; F01N 2900/04; F01N 2900/0402; F01N 2900/0406; F01N 2900/0412; F01N 2900/0416; F01N 2900/0418; F01N 2900/0422; F01N 2900/06; F01N 2900/08; F01N 2900/14; F01N 2900/1402; F01N 2900/1404; F01N 2900/1406; F01N 2900/1602; F01N 2900/1614; F01N 2900/1616; F01N 2900/1621; F01N 2900/18; F01N 2900/1806; F02D 41/1463; F02D 29/06; F02D 41/1446; F02D 41/1475; F02D 2250/36; F02D 41/0027; F02D 41/062; F02D 2200/10; F02D 41/0007; F02D 2200/08; F02D 41/1461; F02P 5/1502; Y02A 50/20; Y02T 10/12; B01D 53/90; B01D 53/94; B01D 53/9404; B01D 53/9409; B01D 53/9418; B01D 53/9422; B01D 53/9431; B01D 53/9436; B01D 53/9477; B01D 2251/00; B01D 2251/20; B01D 2251/206; B01D 2251/2062; B01D 2251/2065; B01D 2251/2067; B01D 2252/102; B01D 2257/40; B01D 2257/404; B01D 2257/406; B01D 2321/2041

See application file for complete search history.

(56) References Cited

U.S. PATENT DOCUMENTS

| | | | |
|---|---|---|---|
| 8,156,729 B2 | 4/2012 | Sun | |
| 9,080,488 B2 | 7/2015 | Upadhyay et al. | |
| 10,100,698 B2* | 10/2018 | Minezawa | F01N 3/2066 |
| 2009/0044612 A1 | 2/2009 | Schoenthaler et al. | |
| 2010/0095933 A1* | 4/2010 | Moriya | F02D 41/222 123/703 |
| 2011/0146239 A1 | 6/2011 | Handler et al. | |
| 2011/0283678 A1 | 11/2011 | Zanetti et al. | |
| 2013/0074817 A1* | 3/2013 | Fisher | F02D 41/1454 123/703 |
| 2014/0033683 A1* | 2/2014 | Wei | F01N 11/00 60/274 |
| 2014/0081563 A1* | 3/2014 | Wang | B60W 20/16 903/902 |
| 2015/0040540 A1 | 2/2015 | Hulser et al. | |
| 2015/0096287 A1* | 4/2015 | Qi | F01N 3/208 60/286 |
| 2016/0252036 A1* | 9/2016 | Xu | F02D 41/1463 123/674 |
| 2016/0273466 A1* | 9/2016 | Nakagawa | F01N 3/0814 |
| 2018/0202338 A1 | 7/2018 | Rusch et al. | |

FOREIGN PATENT DOCUMENTS

| | | |
|---|---|---|
| DE | 102008008618 A1 | 6/2008 |
| FR | 3062162 A1 | 7/2018 |
| JP | 2013047474 A | 3/2013 |
| WO | 2013139848 A1 | 9/2013 |

OTHER PUBLICATIONS

PCT International Search Report of PCT/AT2018/060312 dated Nov. 15, 2019, 8 pgs.

* cited by examiner

INTERNAL COMBUSTION ENGINE WITH EXHAUST GAS AFTERTREATMENT AND CONTROL OF THE NITROGEN OXIDE EMISSIONS

CROSS-REFERENCE TO RELATED APPLICATIONS

This application is a continuation of U.S. application Ser. No. 17/416,499, filed on Jun. 20, 2021, entitled "INTERNAL COMBUSTION ENGINE WITH EXHAUST GAS AFTERTREATMENT AND CONTROL OF THE NITROGEN OXIDE EMISSIONS," which is a National Stage entry from, and claims benefit of, PCT Application No. PCT/AT2018/060312, filed on Dec. 20, 2018; entitled "INTERNAL COMBUSTION ENGINE WITH EXHAUST GAS AFTERTREATMENT AND CONTROL OF THE NITROGEN OXIDE EMISSIONS", which are herein incorporated by reference in their entirety.

BACKGROUND

The invention concerns an internal combustion engine and a genset having such an internal combustion engine.

In operation of an internal combustion engine of the general kind set forth, the combustion processes in the piston-cylinder units result in the production of exhaust gases which have in particular $NO_x$ and hydrocarbon proportions or components (German: $NO_x$-und Kohlenwasserstoffanteile). An exhaust gas aftertreatment apparatus is provided to treat those exhaust gases. Observing the emission limit values is made possible in the thermally steady operation of the internal combustion engine in regard to the $NO_x$ proportion or component by the provision of an SCR catalytic converter ("selective catalytic reduction" catalytic converter) in which a reducing agent (generally urea) is converted. An oxidation catalytic converter is additionally often provided, which is disposed upstream or downstream of the SCR catalytic converter in relation to a flow direction of the exhaust gases. Additionally or alternatively, the system can have an ammonia slip catalytic converter (ASC) connected upstream and/or downstream of the SCR catalytic converter. There are, for example, the following options in relation to the arrangement of the various catalytic converters:

SCR catalytic converter→ASC
ASC→ASC→oxidation catalytic converter
Oxidation catalytic converter→SCR catalytic converter→ASC
Oxidation catalytic converter→SCR catalytic converter→ASC→oxidation catalytic converter The individual catalytic converters can be structurally separate from each other or can be structurally combined.

It has proven to be difficult, in the state of the art, to meet the emission limit values also in a transient operating mode of the internal combustion engine (this is an operating mode in which the rotary speed of a crankshaft driven by the piston-cylinder units and/or the mechanical power output of the internal combustion engine changes, for example, the operating mode immediately after the internal combustion engine starts). That applies in particular to the so-called $NO_x$ average value of the $NO_x$ proportion or component in the exhaust gases at the discharge from the SCR catalytic converter, both upon a warm start and also upon a cold start for the internal combustion engine. Here, it is difficult to keep that $NO_x$ average value lower than a target value prescribed by statute without prolonging a starting time of the internal combustion engine and/or unnecessarily increasing the HC or $CO_2$ emissions.

BRIEF DESCRIPTION

The requirements for a fast start for the internal combustion engine (that is to say the shortest possible starting time) on the one hand and complying with the target value for the $NO_x$ average value on the other hand are in a conflicting area. Dynamic enrichment, that is to say reducing the excess air number of the fuel-air mixture available for combustion (an air excess number $\lambda=1$ corresponds to a stoichiometric ratio of air to fuel, an air excess number $\lambda>1$ corresponds to an air-fuel mixture with a proportion or component of air greater than the stoichiometric ratio), of the air-fuel mixture to be burnt in the piston-cylinder units during the increase in the speed and the power output of the internal combustion engine (and thus a reduction in the starting time) leads to an increase in the $NO_x$ proportion or component in the exhaust gases, that is produced in the combustion processes, in an exhaust manifold of the internal combustion engine. As the SCR catalytic converter to which the exhaust gases are fed by way of the exhaust manifold is still cold when the internal combustion engine involves a cold start, the $NO_x$ conversion rate of the catalytic material of the SCR catalytic converter is not sufficient to be able to reduce an increased $NO_x$ proportion or component at the discharge from the SCR catalytic converter.

If the catalytic converter closed-loop control device of the SCR catalytic converter is too sluggish in its reaction to the changing demands in the transient operating mode, wrong amounts of the reducing agent provided at the SCR catalytic converter can occur. That can lead to critical transient effects, in relation to which either the $NO_x$ passing into the SCR catalytic converter is not sufficiently reduced by virtue of a deficiency in provided reducing agent (so that too much $NO_x$ proportion or component occurs at the discharge from the SCR catalytic converter) or—in the situation of overdosing of the reducing agent—$NH_3$ resulting from the reducing agent can pass into a downstream-disposed oxidation catalytic converter and thus additionally increase the $NO_x$ proportion or component in the exhaust gas. Those critical transient effects can also occur due to sluggish thermal performance on the part of the SCR catalytic converter.

Closed-loop control circuits for controlling the exhaust gas aftertreatment apparatus in accordance with the state of the art have proven not to be reliable enough to meet a desired target value of the $NO_x$ proportion or component in the exhaust gas at the discharge from the SCR catalytic converter, in particular when interference factors occur like a changing moisture content in the ambient air of the internal combustion engine or the proportions or components (in particular the SCR catalytic converter) of the internal combustion engine age.

The object of the invention is to provide an internal combustion engine of the general kind set forth, in which fulfilment of a predetermined or predeterminable target value for the average value of the $NO_x$ proportion or component of the exhaust gases occurring in operation of the internal combustion engine is possible in a transient operating mode of the internal combustion engine, in particular upon a cold start or a warm start of the internal combustion engine, without the acceptance of a delayed increase in the speed and/or mechanical power output of the internal combustion engine (or electrical power of a genset involving mechanical coupling of the internal combustion engine to an electric generator) and a genset with such an internal combustion engine. Preferably, with an internal combustion engine according to the invention or a genset according to the invention having such an internal combustion engine the aim of the invention is also to make it possible:

- to keep the average value of the $NO_x$ proportion or component of the exhaust gases occurring in operation of the internal combustion engine equal to a predetermined or predeterminable target value upon the occurrence of interference factors like changing humidity in the ambient air or upon aging of proportions or components of the internal combustion engine (in particular the SCR catalytic converter), and/or
- to take account of secondary conditions which are also predeterminable like consumption of reducing agent or total operating resources outlay, and/or
- not to increase the content of HC emissions.

That object is attained by an internal combustion engine having the features of claim 1 and a genset having such an internal combustion engine. Advantageous embodiments of the invention are defined in the appendant claims.

To attain that object it is provided that:

- the engine closed-loop control unit is or can be prescribed a target value for an $NO_x$ average value of the $NO_x$ proportion or component of the exhaust gases, that occurs in relation to a predeterminable or predetermined period of time at a discharge from the exhaust gas aftertreatment apparatus (preferably by the manufacturer of the internal combustion engine but possibly also by an operator of the internal combustion engine),
- the engine closed-loop control unit is configured at least in one operating mode to continuously calculate an $NO_x$ reference value for the catalytic converter closed-loop control device having regard to already emitted $NO_x$ proportions or components and the predeterminable or predetermined target value, which reference value is so selected that at the end of a predeterminable or predetermined period of time the predeterminable or predetermined target value results at the discharge of the exhaust gas aftertreatment apparatus, and
- the calculated $NO_x$ reference value is fed to the catalytic converter closed-loop control device as setpoint value.

The $NO_x$ proportion or component, the $NO_x$ reference value, the target value and the $NO_x$ average value can be specified either in the form of a mass flow or in the form of a concentration.

The discharge from the exhaust gas aftertreatment apparatus is the discharge of the at least one SCR catalytic converter, if downstream thereof there are no further catalytic converter apparatuses, in particular no oxidation catalytic converter and/or ammonia slip catalytic converter; if an oxidation catalytic converter and/or an ammonia slip catalytic converter is disposed downstream of the at least one SCR catalytic converter, then the discharge of the oxidation catalytic converter or the ammonia slip catalytic converter is the discharge from the exhaust gas aftertreatment apparatus.

It may suffice if the engine closed-loop control unit activates the operating mode according to the invention only when it is to be expected or if the situation is looming that the predeterminable or predetermined target value cannot be reached without the measure or measures according to the invention.

By virtue of the invention, it is possible in particular during a transient operating mode (in particular during a cold or warm start) to temporarily allow higher levels of $NO_x$ proportion or component in the exhaust gas at the discharge from the exhaust gas aftertreatment apparatus, as this ensures that overall after expiry of the predeterminable or predetermined period of time, the $NO_x$ average value of the exhaust gas $NO_x$ proportion or component, that occurs in relation to the predetermined or predeterminable period of time at the discharge from the exhaust gas aftertreatment apparatus, is equal to the predeterminable or predetermined target value.

The invention makes it possible to observe a predetermined or predeterminable starting time without the target value for the $NO_x$ average value in relation to the predeterminable or predetermined period of time being exceeded. The starting time is that time which elapses until, from starting the internal combustion engine (for example, by actuating a start button), a predetermined or predeterminable target value for the speed and/or the mechanical power output of the internal combustion engine (or for the electrical power output of a genset formed by mechanical coupling of the internal combustion engine to an electric generator) is achieved.

The invention makes it possible to minimize consumption of reducing agent by the exhaust gas aftertreatment apparatus, because it is possible to operate over longer periods of time than in the state of the art closer to the predeterminable or predetermined target value for the $NO_x$ average value, and thus less reducing agent is required. In those periods of time, the internal combustion engine can be operated at a higher level of efficiency than in the state of the art.

In the invention, the closed-loop control circuit for controlling exhaust gases from the internal combustion engine, therefore, has at least two proportions or components which are logically separated from each other (which in hardware terms can be in a common electronic control device or in physically mutually separated electronic control devices), more specifically on the one hand the engine closed-loop control unit and on the other hand the catalytic converter closed-loop control device.

The engine closed-loop control unit has various functions:

- by means of an engine open-loop control apparatus (which can be designed in accordance with the state of the art and therefore does not need to be described in greater detail here) it influences actuators of the engine block for influencing the state thereof (in particular influencing the fuel available for the combustion processes, as an absolute variable and/or in relation to the air in the cylinders of the engine block, controlling further proportions or components of the engine block like the performance of a turbocharger which is possibly present, a wastegate; controlling the position of the ignition time in the piston-cylinder units; shutting down ignition devices for selected piston-cylinder units; and so forth), in particular, to provide a desired rotary speed and/or power output performance on the part of the internal combustion engine;
- it receives signals from sensors corresponding to the state of the art, by way of which the engine closed-loop control unit can acquire or determine information about the state of the engine block (in particular, in regard to the above-described control tasks) and optionally the state of the exhaust gas aftertreatment apparatus;
- it provides for open-loop control (having regard to the signals made available by the sensors) or closed-loop control for the catalytic converter closed-loop control device by means of control commands, by presetting a desired $NO_x$ setpoint value in the exhaust gas at a discharge from the exhaust gas aftertreatment apparatus (as to how the catalytic converter closed-loop control device has to actuate the exhaust gas aftertreatment apparatus so that that aim is achieved, corresponds to the state of the art) and provides for open-loop control—if required—of the engine block so that the catalytic converter closed-loop control device can achieve the predetermined desired $NO_x$ setpoint value in the exhaust gas at the discharge from the exhaust gas aftertreatment apparatus as close as possible to the target value at the time of the end of the predeterminable or predetermined period of time.

The catalytic converter closed-loop control device:

- receives control commands from the engine closed-loop control unit, in particular the above-discussed predetermined desired $NO_x$ setpoint value in the exhaust gas at the discharge from the exhaust gas aftertreatment apparatus and converts same, in particular by controlling an injection device for the injection of reducing agent (for example urea) into an exhaust manifold before a catalytic zone of the at least one SCR catalytic converter,
- optionally, in accordance with the control commands of the engine closed-loop control unit, it can influence the state of the at least one SCR catalytic converter by means of optionally provided additional devices (like, for example, a heating device for heating the catalytic zone).

Apart from the fact that the catalytic converter closed-loop control device receives control commands from the engine closed-loop control unit, it can be designed in accordance with the state of the art and, therefore, does not need to be described in greater detail here.

The time-related $NO_x$ average value $\overline{NO_x}$ of the $NO_x$ proportion or component of the exhaust gases at the discharge of the at least one SCR catalytic converter is defined in relation to a period of time $t_{av}=t_2-t_1$ by the following equation ($NO_x$ (t) is in that case the time rate of the $NO_x$ proportion or component at the time t, therefore the $NO_x$ mass flow or the $NO_x$ concentration):

$$\overline{NO_x} = \frac{1}{t_{av}} \int_{t_1}^{t_2} NO_x(t')dt'$$

Preferably, the control according to the invention is implemented as follows:

The engine closed-loop control unit is or can be prescribed a target value $\overline{NO_{x,Tar}}$ which has to be reached after expiry of the predeterminable or predetermined period of time $t_{av}$, (and generally may not be exceeded). The period $t_{av}$ can be for example 30 minutes, but, alternatively or additionally, other periods $t_{av}$ are also conceivable like for example an hours value or a day value and so forth. It is conceivable that the period $t_{av}$ only has to be covered once and then control can be operated in accordance with the state of the art. It is also conceivable that the period $t_{av}$ is to be considered floatingly (and, for example, always in relation to the last preceding 30 minutes, one hour, one day and so forth). In the state of the art, that target value $\overline{NO_{x,Tar}}$ was reduced to prevent it being exceeded, by a safety margin which was prescribed for the catalytic converter closed-loop control device as a constant $NO_x$ setpoint value.

The period of time $t_{av}$, can:
- begin with starting of the internal combustion engine and/or
- begin at a fixed moment in time after synchronization of the genset with a power supply grid and/or during the power output ramp of the internal combustion engine and/or while running up the speed of the internal combustion engine, and/or
- begin to run after attainment of the nominal power output of the internal combustion engine when there is a change in load and can preferably last until the change in load subsides.

The engine closed-loop control unit of the internal combustion engine according to the invention calculates continuously or in time steps (hereinafter for brevity: ongoing) having regard to the already emitted $NO_x$ proportions or components, how large an $NO_x$ mass flow has to be, which mass flow in relation to the remaining period of time for the purposes of this calculation is deemed to be constant (but ongoing calculated afresh in each calculation step) so that at the end of the predeterminable or predetermined period of time $t_{av}$, at the discharge from the exhaust gas aftertreatment apparatus the predeterminable or predetermined target value $\overline{NO_{x,Tar}}$ ensues. That calculated $NO_x$ mass flow is ongoing determined as an $NO_x$ reference value $NO_{x,Ref}(t)$ at the current time t (for $t_1 < t < t_2$) from the following equation and continuously passed to the exhaust gas control device as the $NO_x$ setpoint value:

$$\overline{NO}_{x,Tar} = \frac{1}{t_{av}}\left(\int_{t_1}^{t} NO_x(t')dt' + (t_2 - t)NO_{x,Ref}(t)\right)$$

The term on the left-hand side of the equation is known, as it is or can be prescribed for the engine closed-loop control unit as the target value. The first term on the right-hand side of this equation takes account of the $NO_x$ proportions or components which were already emitted in the period of time $t_1 < t$ and are therefore known (they can be measured or—depending on the state of the engine block and the exhaust gas aftertreatment apparatus—can be calculated or taken from a look-up table during the period $t_1 < t$), the second term calculates that $NO_x$ proportion or component which may be emitted from the point of view of the time t in the remaining period $t < t_2$ so that this gives the predetermined or predeterminable target value $\overline{NO_{x,Tar}}$ and is to be calculated by means of this equation. Resolving that equation in accordance with the unknown $NO_{x,Ref}(t)$ gives:

$$NO_{x,Ref}(t) = \frac{1}{t_2 - t}\left(t_{av} \cdot \overline{NO}_{x,Tar} - \int_{t_1}^{t} NO_x(t')dt'\right)$$

It is conceivable that the engine closed-loop control unit is configured to take account of exhaust gas $NO_x$ proportions or components which have already occurred before the beginning of the period $t_{av}$ in cumulated relationship for calculation of the $NO_x$ reference value $NO_{x,Ref}(t)$. Those cumulated $NO_x$ proportions or components cumulNO$_x$ can be known from measurements, calculations or estimations. In that case $NO_{x,Ref}(t)$ can be calculated from the known $\overline{NO_{x,Tar}}$, the known cumulated $NO_x$ proportions or components cumulNO$_x$ and the known previously emitted $NO_x$ proportions or components by resolution in accordance with $NO_{x,Ref}(t)$:

$$NO_{x,Ref}(t) = \frac{1}{t_2 - t}\left(t_{av} \cdot \overline{NO}_{x,Tar} - \int_{t_1}^{t} NO_x(t')dt' - cumulNO_x\right)$$

The more time of the predeterminable or predeterminable period $t_{av}$ has elapsed the correspondingly closer the $NO_x$ reference value $NO_{x,Ref}(t)$ comes to the predetermined or predeterminable target value $\overline{NO_{x,Tar}}$ until finally it reaches it at $t=t_2$.

After expiry of the predeterminable or predetermined period of time, the engine closed-loop control unit can be configured to control the engine block and the catalytic converter closed-loop control device in such a way as corresponds to a steady-state operation of the internal combustion engine. That kind of control is known from the state of the art and, therefore, does not have to be described in greater detail here.

How much of the mass flow of $NO_x$ proportion or component $NO_{x,in}(t)$ that comes from the engine block and passes into the exhaust gas aftertreatment apparatus is reduced in at least one SCR catalytic converter (and in a possibly also provided oxidation catalytic converter) and leaves same as an issuing mass flow $NO_{x,out}(t)$ can be easily expressed by the so-called conversion rate $R_{conv}(t)$ defined by the following equation:

$$R_{conv}(t) = 1 - \frac{NO_{x,out}(t)}{NO_{x,in}(t)}$$

The momentary mass flows $NO_{x,in}(t)$ and $NO_{x,out}(t)$ can be measured by $NO_x$ sensors. Alternatively, values from a look-up table or from a calculation can be used as it is known from theory, what mass flows are to be expected for a given state of the engine block.

The conversion rate $R_{conv}(t)$ at the time t can be monitored by the engine closed-loop control unit as an absolute value or—preferably—relative to an expected target value and used for open-loop or closed-loop control of the catalytic converter closed-loop control device.

If the at least one SCR catalytic converter is not active at a time t (for example, because the temperature of the catalytic zone is too low) and there is no oxidation catalytic converter, then naturally $NO_{x,out}(t)=NO_{x,in}(t)$ and thus $R_{conv}(t)=0$.

It is particularly preferably provided that the engine closed-loop control unit is configured, during a first part of the predeterminable or predetermined period of time (preferably from starting the internal combustion engine), to predetermine a momentary (time-dependent, in particular ramp shaped) setpoint value for the preferably electrical power output of the internal combustion engine lower than corresponds to the desired setpoint value in a steady-state mode of operation of the internal combustion engine.

In that first part of the predetermined or predeterminable period of time, there is a first and optionally a second maximum of the $NO_x$ proportions or components in the exhaust gas.

A first maximum is caused by enrichment of the air-fuel mixture for increasing the engine speed.

A second maximum can occur when at least one turbocharger which is provided is switched on until the turbocharger or turbochargers overcomes or overcome the turbo lag. After the turbo lag is overcome, the engine block is in a state in which an actual value for a charging pressure of a charge air (or a mixture) can follow a setpoint value predetermined by the engine closed-loop control unit, so that this gives stable values for the exhaust gas $NO_x$ proportion or component (any deviations can be attributed to air humidity, charge air temperature and so forth).

A preferred embodiment provides that the engine closed-loop control unit is configured, upon control of the engine block, besides a state of the engine block also to take account of a state of the exhaust gas aftertreatment apparatus. That can relate to the above-described first part of the predeterminable or predetermined period of time and/or (independently of the first part of the predetermined or predeterminable period of time) can be indicated to take account of aging of the at least one SCR catalytic converter (which reduces the efficiency of $NO_x$ reduction).

In that first part of the predeterminable or predetermined period of time, the temperature of the catalytic zone of the at least one SCR catalytic converter is still below a temperature necessary for reduction of the $NO_x$, so that here the exhaust gas $NO_x$ proportions or components after the piston-cylinder units are of substantially the same size as the exhaust gas $NO_x$ proportions or components at the discharge from the exhaust gas aftertreatment apparatus (therefore $R_{conv}(t)\approx 0$). Taking account of that state of the at least one SCR catalytic converter by the engine closed-loop control unit, upon control of the engine block in a preferred embodiment, provides that overall during the first part of the predetermined or predeterminable period of time fewer $NO_x$ proportions or components are produced by the engine block.

That can be effected in such a way that the engine closed-loop control unit is configured to move a current first operating point of the engine block, which is present after attainment of a nominal power output of the internal combustion engine, to a transient operating point with lower $NO_x$ emissions, for example, to an operating point with higher temperatures of the exhaust gases immediately after exhaust valves of the piston-cylinder units (preferably, in that case, the temperature of the hottest piston-cylinder unit is used by the engine closed-loop control unit). That can be effected, for example, by setting an ignition time of the ignition in the piston-cylinder units to late (whereby the $NO_x$ produced is reduced). It is however also possible—optionally as an alternative—to implement a (preferably simultaneous) reduction in the strength of the fuel-air mixture available for combustion in the piston-cylinder units to reduce the $NO_x$ produced. Those measures are of course effected in such a way that no misfires occur. In a combustion diagram (with the coordinate axes "air excess number" and "ignition time"), the operating point thereby moves within the knock limit and the misfire limit in the direction of higher exhaust gas temperatures.

That can optionally be effected in a first step (along a first trajectory in the combustion diagram) by means of a pre-control action to cause a rapid first adjustment of the operating point of the engine block. That can be followed in a second step (along a second trajectory in the combustion diagram) by a closed-loop control action in order to be able to more precisely select the ensuing transient operating point.

If the at least one SCR catalytic converter begins to reduce the $NO_x$ proportion or component in the exhaust gas (because the catalytic zone has reached the required temperature), the engine closed-loop control unit provides for open-loop and/or closed-loop control of the engine block in such a way that the current operating point moves away from the transient operating point back in the direction of the first operating point (preferably on the same trajectory as for the movement of the nominal operating point to the steady-state operating point but in the reverse direction) and reaches same.

For the above-discussed open-loop and/or closed-loop control, the engine closed-loop control unit can use the current conversion rate $R_{conv}(t)$. If the current $NO_x$ proportion or component is excessive (that is to say, the exhaust gas aftertreatment apparatus is not capable of observing the $NO_x$ reference value $NO_{x,Ref}(t)$ predetermined by the engine closed-loop control unit at the discharge thereof) and the current conversion rate $R_{conv}(t)$ is below a predeterminable or predetermined value (this can be, for example, near to zero), then the above-described shift in the operating point from the first operating point towards the transient operating point with reduced $NO_x$ emissions takes place. When the current conversion rate $R_{conv}(t)$ reaches or exceeds the predeterminable or predetermined value, the above-described return shift of the operating point from the transient operating point towards the first operating point takes place, preferably in (for example, proportional) dependency on the current conversion rate $R_{conv}(t)$ until it has reached a target conversion rate at which the first operating point is to be reached.

As soon as the temperature required for reduction of the $NO_x$ in the catalytic zone of the at least one SCR catalytic converter is reached, the engine closed-loop control unit therefore recognizes that new state of the at least one SCR catalytic converter and can now control the engine block in such a way that the engine block is operated at the first operating point at optimum efficiency (and, in return, with higher $NO_x$ proportions or components of the exhaust gas in an exhaust manifold of the engine block).

To sum up: in that way open-loop and/or closed-loop control of the current operating point of the engine block is effected in dependence on the conversion rate $R_{conv}(t)$ of the exhaust gas aftertreatment apparatus (possibly, the at least one SCR catalytic converter, if there are no further catalytic converters), preferably after the expiry of an internal combustion engine starting time.

To reduce the exhaust gas $NO_x$ proportion or component emitted during the starting time by the internal combustion engine—in combination with the above-described embodiments or in isolation—a preferred embodiment of the invention provides that the engine closed-loop control unit is configured during the starting time of the internal combustion engine to predetermine a power ramp for the engine block in a first time portion, preferably after attainment of the minimum power output, until reaching a predetermined limit value for the power output with a first lesser gradient and in a second time portion until reaching a nominal power output of the internal combustion engine with a second greater gradient, wherein it is preferably provided that the second greater gradient is calculated in dependence on the remaining time until the starting time is reached. The first lesser gradient prevents excessive enrichment of the air-fuel mixture and thus excessive production of $NO_x$ in the exhaust gas in the first time portion. The second greater gradient ensures that the nominal power output is reached within the desired starting time.

To reduce the exhaust gas $NO_x$ proportion or component emitted during the starting time by the internal combustion engine—in combination with the above-described embodiments or in isolation—a preferred embodiment of the invention provides that the engine closed-loop control unit, for reduction of the exhaust gas $NO_x$ proportion or component emitted during a starting time of the internal combustion engine, is configured within the starting time of the internal combustion engine to increase an air excess number of the air-fuel mixture available for combustion in the piston-cylinder units from a lower first value to a higher second value. That reduces the $NO_x$ proportions or components in the exhaust gases, that are emitted during the starting time by the internal combustion engine.

In a preferred embodiment of the invention—in combination with the above-described embodiments or in isolation—it is provided that the engine closed-loop control unit is configured to raise a charging pressure of the engine block after reaching a nominal power output of the internal combustion engine for a predeterminable or predetermined period of time. That can provide for a reduction in the strength of the air-fuel mixture available for combustion in the piston-cylinder units and thus a reduction in the exhaust gas $NO_x$ proportion or component issuing from the engine block.

The nominal operating point of the internal combustion engine is the desired operating point in a steady-state operation, therein a leaner fuel-air mixture with an air excess number $\lambda>1$ is used. Preferably, therefore, the internal combustion engine is in the form of a lean burn engine, that is to say the internal combustion engine is always operated with an air excess number $\lambda>1$ and, even with a possible enrichment, an air excess number $\lambda>1$ is maintained.

Quite generally a strength reduction can be achieved by raising the charging pressure (as described for example in EP 0 259 382 B1) and/or by a direct reduction in the absolute amount of fuel. Correspondingly, enrichment can be achieved by a reduction in the charging pressure or by a direct increase in the absolute amount of the fuel.

In an embodiment of the invention—in combination with the above-described embodiments or in isolation—it is provided that the engine closed-loop control unit is configured, in the selection of a desired air excess number $\lambda$, to take account of a synchronization duration (time duration until a synchronous speed is achieved relative to a grid frequency of the power supply grid) of a genset including the internal combustion engine with a power supply grid. In that case, for example, enrichment limits can be selected in dependence on the synchronization duration. If, for example, the synchronization duration is short (that is to say the synchronous speed is quickly reached), then enrichment is to be less than when a longer synchronization duration is involved, as there is more time available from the starting time to reach the nominal power output of the internal combustion engine. If, in contrast, the synchronization duration is long (that is to say the synchronous speed is reached slowly), then enrichment has to be greater than in the case of a shorter synchronization duration as less time remains from the starting time to reach the nominal power output of the internal combustion engine. The terms "long" and "short" are naturally to be considered in relation to a predetermined or predeterminable limit value for the synchronization duration.

It is preferably provided that the synchronization time is measured and the decision regarding the further procedure in respect of the air excess number $\lambda$ is to be made as soon as the length of the synchronization time is established.

Examples of sensors, by way of which the engine closed-loop control unit can acquire or determine information about the state of the engine block (in particular in regard to the above-described control functions) and the state of the exhaust gas aftertreatment apparatus, are $NO_x$ sensors and temperature sensors for measuring an exhaust gas temperature.

By way of example, at least one $NO_x$ sensor can be provided in an exhaust manifold after a possibly provided low-pressure turbine of a turbocharger before an injection device for reducing agent of the at least one SCR catalytic converter (preferably there is provided at least one such $NO_x$ sensor for each engine bank of the engine block) and/or at least one $NO_x$ sensor at a discharge from the exhaust gas aftertreatment apparatus (for example the at least one SCR catalytic converter and/or an oxidation catalytic converter which may be provided).

For example, for each piston-cylinder unit, a temperature sensor can be arranged directly after the exhaust valve or valves of the respective piston-cylinder unit. Preferably, the temperature of the exhaust gases from all piston-cylinder units is determined and the temperature of the hottest piston-cylinder unit is used for control of the internal combustion engine by the engine closed-loop control unit.

By way of example, at least one temperature sensor can be provided at an inlet location of the at least one SCR catalytic converter.

For example, there can be provided at least one temperature sensor at a discharge from an oxidation catalyst which is possibly provided.

The internal combustion engine according to the invention is preferably a spark-ignition four-stroke engine and preferably has at least eight (and particularly preferably at least twenty) piston-cylinder units. The invention can preferably be used in relation to a stationary internal combustion engine. The internal combustion engine preferably serves as part of a genset as a mechanical drive, for example, in combination with an electric generator, which is or can be mechanically coupled, for generating electrical energy.

The introduction of fuel into the piston-cylinder units can be effected by means of port injection or in the form of a pre-mixed air-fuel mixture.

A preferred reducing agent is urea.

A preferred embodiment of the invention provides that the engine closed-loop control unit is configured not to exceed a predetermined or predeterminable limit value, which is in particular dependent on the mode of operation (steady-state or transient)—possibly time-dependent—for a momentary mass flow or for a momentary concentration of the $NO_x$ proportions or components of the exhaust gases in an exhaust manifold.

BRIEF DESCRIPTION OF THE DRAWINGS

Embodiments of the invention are discussed with reference to the Figures in which.

DETAILED DESCRIPTION

Figure 1:
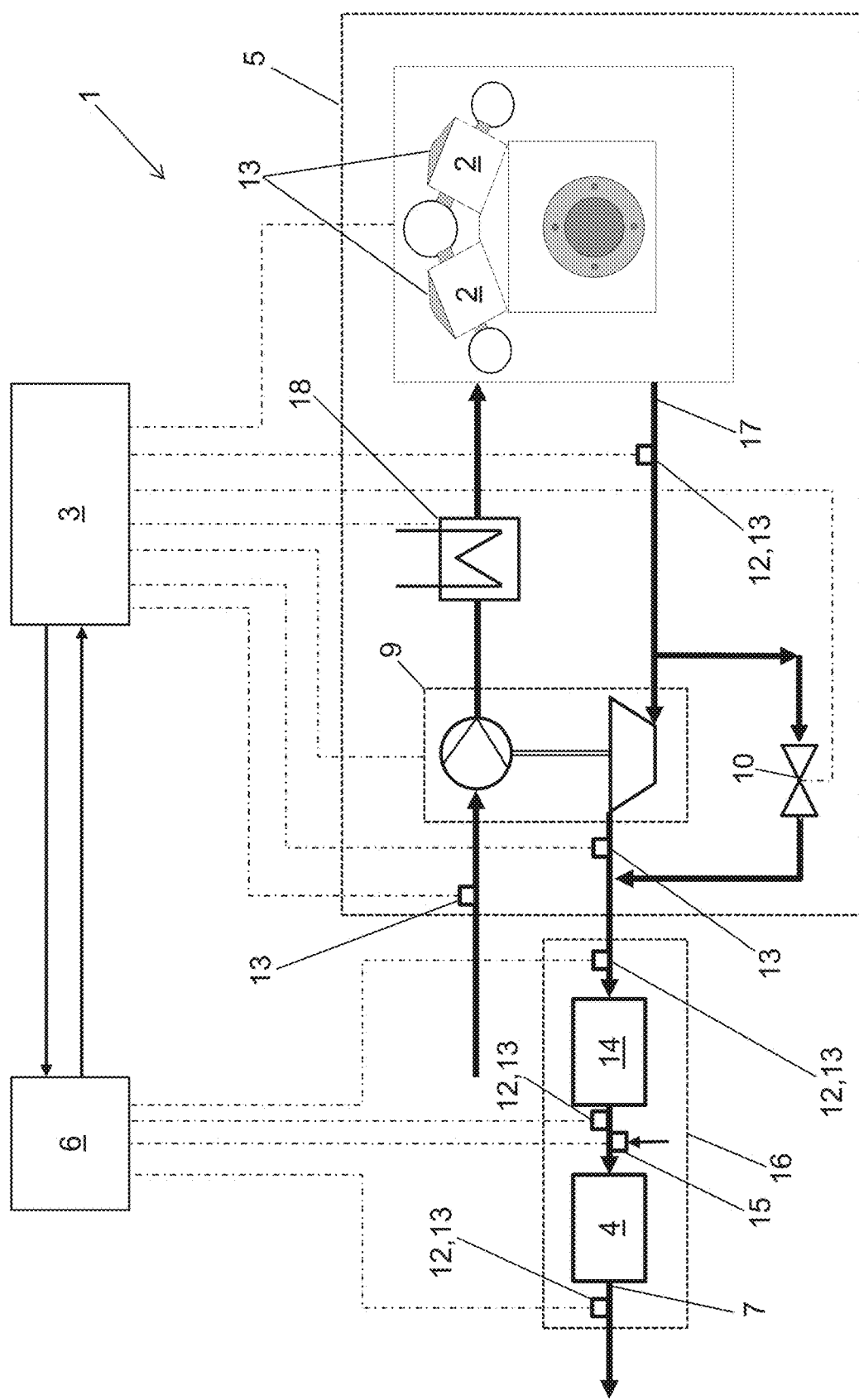
FIG. 1 shows an internal combustion engine according to the invention.
Figure 3:
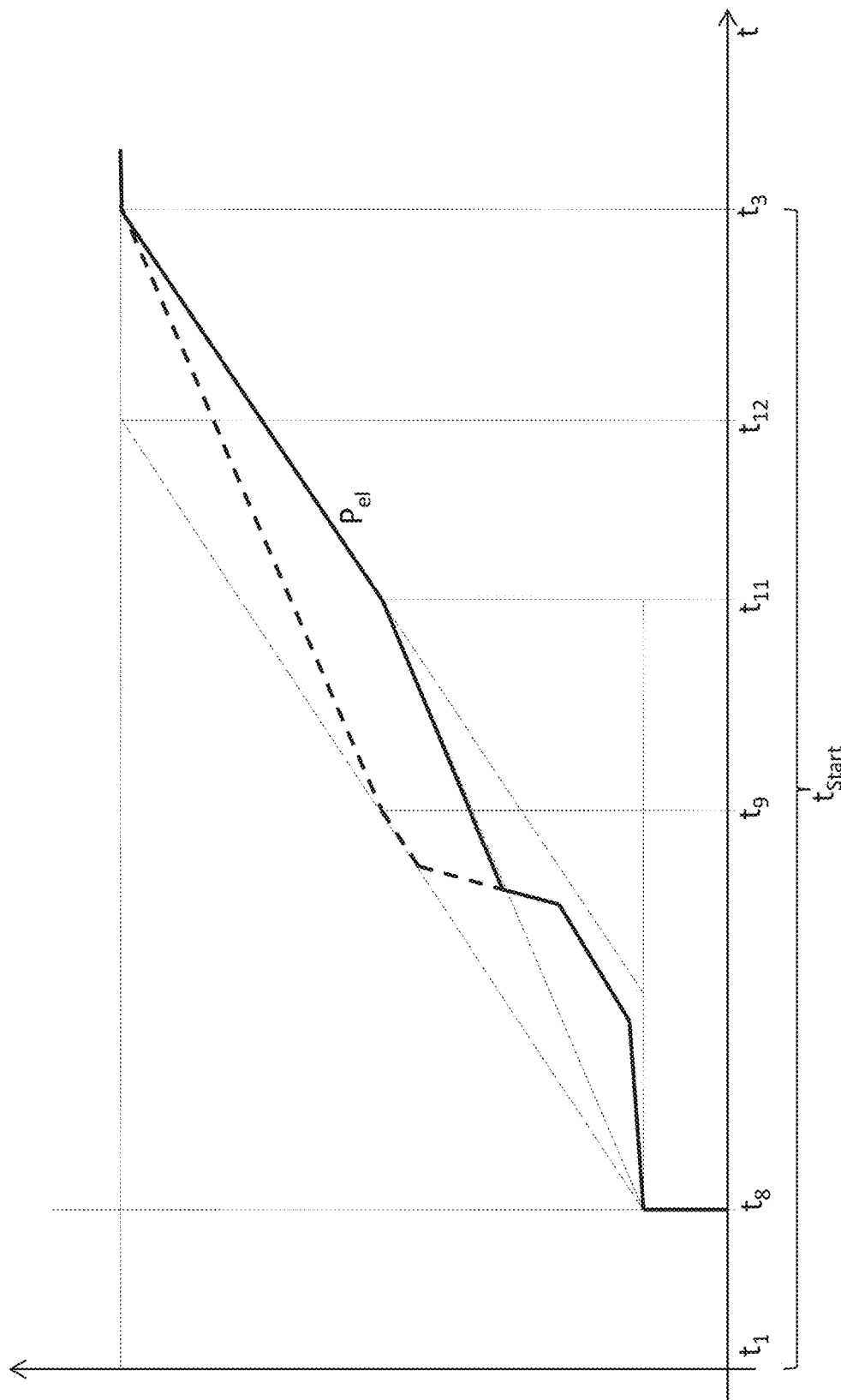
FIG. 3 shows a further view of the state of the internal combustion engine in relation to time on the basis of selected parameters with adaptation of a load ramp.
Figure 5:
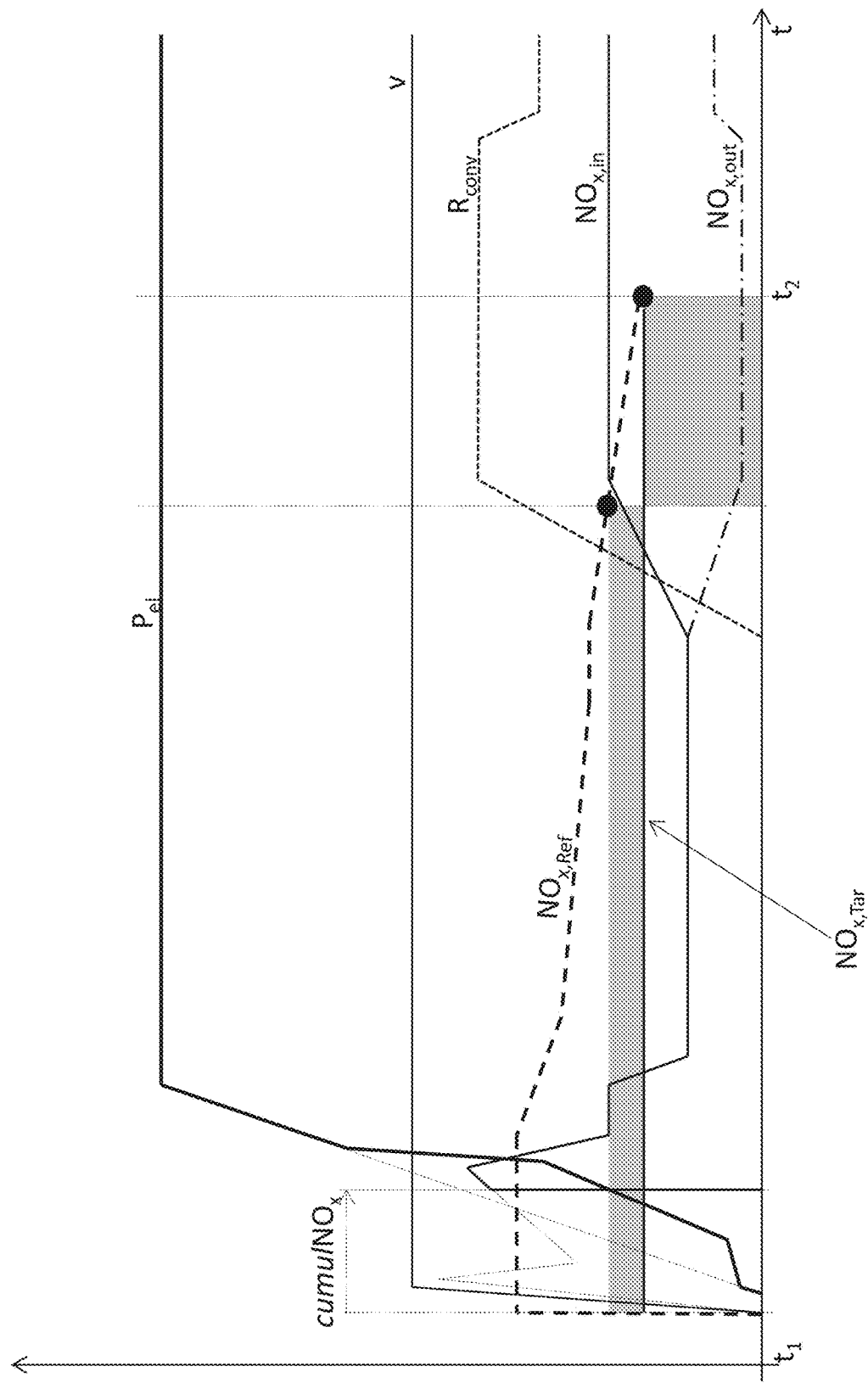
FIG. 5 shows a view of the state of the internal combustion engine in relation to time on the basis of selected parameters when using the open-loop and closed-loop control strategy shown in FIG. 4.

The moments in time identified by the same references in FIGS. 1, 3 and 5 are identical.

FIG. 1 diagrammatically shows an embodiment of an internal combustion engine 1 according to the invention with the following proportions or components:
- 2 piston-cylinder units
- 3 engine closed-loop control unit
- 4 SCR catalytic converter
- 5 engine block
- 6 catalytic converter closed-loop control device
- 7 discharge from the exhaust gas aftertreatment apparatus
- 8 electric generator of a genset including the internal combustion engine
- 9 turbocharger (optional)
- 10 wastegate (optional)
- 11 ignition device
- 12 $NO_x$ sensor (optional), in particular $NO_x$ sensors do not have to be provided at all illustrated positions,
- 13 temperature sensor (optional), in particular temperature sensors do not have to provided at all illustrated positions,
- 14 oxidation catalytic converter (optional), in particular alternatively or additionally there can be an ammonia slip catalytic converter and/or oxidation catalytic converter upstream of the SCR catalytic converter
- 15 injection device for reducing agent
- 16 exhaust gas aftertreatment apparatus
- 17 exhaust manifold
- 18 charging air temperature control device (optional)

Figure 6:
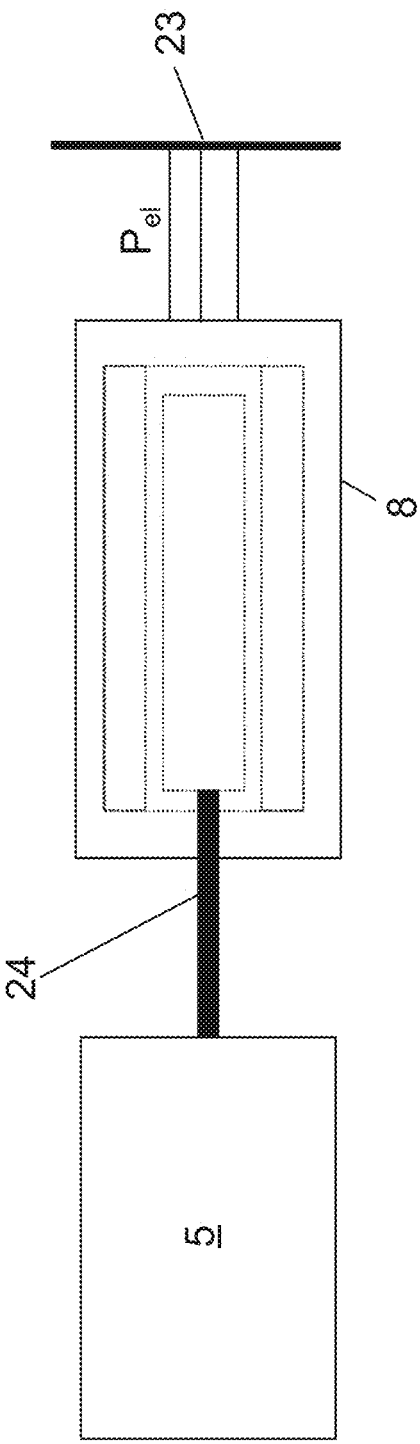
FIG. 6 shows a genset according to the invention.

FIG. 6 shows a genset, which is or can be electrically connected to a power supply grid 23, and having an internal combustion engine 1 according to the invention which is coupled to an electric generator 8 by means of a mechanical coupling 24.

The term state of the engine block 5 is used to denote in particular (individually or in any combination, naturally not all the following variables have to be taken into account):
- the temperature of the exhaust gases directly after a turbine of a possibly provided turbocharger 9 and/or directly after exhaust valves of the piston-cylinder units 2;
- temperature of operating means (like oil, cooling water, . . . ) or a material of the engine block 5 itself;
- $NO_x$ proportion or component in the exhaust gases in an exhaust manifold 17 after a possibly provided low-pressure turbine of a turbocharger 9 before an injection device 15 for reducing agent of the at least one SCR catalytic converter 4 (preferably for each engine bank of the engine block 5);
- $NO_x$ proportion or component in the exhaust gases at a discharge 7 from the at least one SCR catalytic converter;
- ratio of NO proportion or component to $NO_2$ in the exhaust gas or the $NO_2$ proportion or component to $NO_x$ or the NO proportion or component to $NO_x$, that can be converted as desired, as the following applies: $NO_x=NO+NO_2$;
- actual speed of a crankshaft of the internal combustion engine 1, driven by the piston-cylinder units 2 of the engine block 5;
- speed of a turbocharger 9 which is possibly provided;
- exhaust gas pressure ensuing from a degree of opening of a wastegate 10 which is possibly provided;
- selected ignition times for the piston-cylinder units 2;
- on/off state of ignition devices for the piston-cylinder units 2;

charging pressure (pressure in front of the inlet valves of the piston-cylinder units 2);

charging temperature (temperature in front of the inlet valves of the piston-cylinder units 2);

induction air temperature;

fuel mass flow or mixture mass flow to the piston-cylinder units 2;

air mass flow;

currently produced mechanical and/or electrical (in the case of a genset) power; and valve control times (in the case of a variable valve drive).

The state of the engine block 5 can be influenced by way of the engine closed-loop control unit 3 by means of actuators known in the state of the art (and therefore not shown). For example:

the temperature of the exhaust gases can be influenced directly after outlet valves of the piston-cylinder units 2 by the selection of an ignition time and/or the air excess number of the fuel-air mixture and/or exhaust gas recycling, total amount of fuel, temperature of the charging air or the fuel-air mixture in front of inlet valves of the piston-cylinder units 2, skip firing, valve control times and so forth;

the $NO_x$ proportion or component in the exhaust gases in the exhaust manifold 17 can be influenced by the choice of a combustion temperature and/or combustion speed, in particular by the choice of an ignition time and/or the air excess number $\lambda$ of the fuel-air mixture and/or exhaust gas recycling, total amount of fuel, temperature of the charging air or the fuel-air mixture in front of inlet valves of the piston-cylinder units 2, valve control times and so forth;

the exhaust gas backpressure can be influenced by the degree of opening of an optionally provided wastegate 10 or by a variable turbine geometry (VTG); and the selected ignition times and/or the on/off state (skip firing) of ignition devices for the piston-cylinder units 2 can be influenced by appropriate actuation of the ignition devices of the piston-cylinder units 2.

The term state of the exhaust gas aftertreatment apparatus 16 is used to mean in particular (individually or in any combination, naturally not all the following variables have to be taken into consideration):

the exhaust gas mass flow fed to the at least one SCR catalytic converter 4;

a temperature of a catalytic zone and/or a temperature of the exhaust gas at an inlet location and/or a temperature of the exhaust gas at a discharge location of the at least one SCR catalytic converter 4;

a mass flow Redux of reducing agent introduced into the at least one SCR catalytic converter 4;

an amount of reducing agent reacted in the catalytic zone of the at least one SCR catalytic converter 4;

an $NH_3$ storage state of the at least one SCR catalytic converter 4;

the state of a possibly provided heating device for the at least one SCR catalytic converter 4; and state of a possibly provided oxidation catalytic converter 14.

The state of the exhaust gas aftertreatment apparatus 16 can be influenced by the catalytic converter closed-loop control device 6 by way of actuators known in the state of the art (and therefore not shown). By way of example, the following can be influenced:

the exhaust gas mass flow fed to the at least one SCR catalytic converter 4, influenced by the selection of a power output or an operating point of the engine block 5;

the temperature of the catalytic zone of the at least one SCR catalytic converter 4, influenced by a temperature of the supplied exhaust gas and/or a heating device and/or a change in the exhaust gas mass flow;

the temperature at the inlet to the at least one SCR catalytic converter 4, influenced by a temperature of the supplied exhaust gas and/or a heating device;

a mass flow Redux of reducing agent introduced into the at least one SCR catalytic converter 4, being influenced by suitable actuation of an injection device 15 for reducing agent;

the $NH_3$ storage state in the catalytic zone of the at least one SCR catalytic converter 4, being influenced by the supplied amount of reducing agent, the temperature of the catalytic zone, a change in the exhaust gas mass flow, a change in the $NO_x$ proportion or component and/or the $NO_2$ proportion or component of the exhaust gas.

The engine closed-loop control unit 3 can be or is prescribed a target value $\overline{NO_{x,Tar}}$ for an $NO_x$ average value $NO_x$ of the $NO_x$ proportion or component of the exhaust gases in relation to a predetermined or predeterminable period of time $t_{av}$, at a discharge 7 from the exhaust gas aftertreatment apparatus 16.

The engine closed-loop control unit 3, at least during the period $t_{av}$, is in an operating mode in which it is configured to continuously calculate an $NO_x$ reference value $NO_{x,Ref}(t)$ for the catalytic converter closed-loop control device 6 having regard to already emitted $NO_x$ proportions or components and the predeterminable or predetermined target value $\overline{NO_{x,Tar}}$, which reference value is so selected that, at the end of the predeterminable or predetermined period of time $t_{av}$, the predeterminable or predetermined target value $\overline{NO_{x,Tar}}$ results at the discharge of the exhaust gas aftertreatment apparatus 16, and to feed the calculated $NO_x$ reference value $NO_{x,Ref}(t)$ to the catalytic converter closed-loop control device 6 as an $NO_x$ setpoint value.

Figure 2:
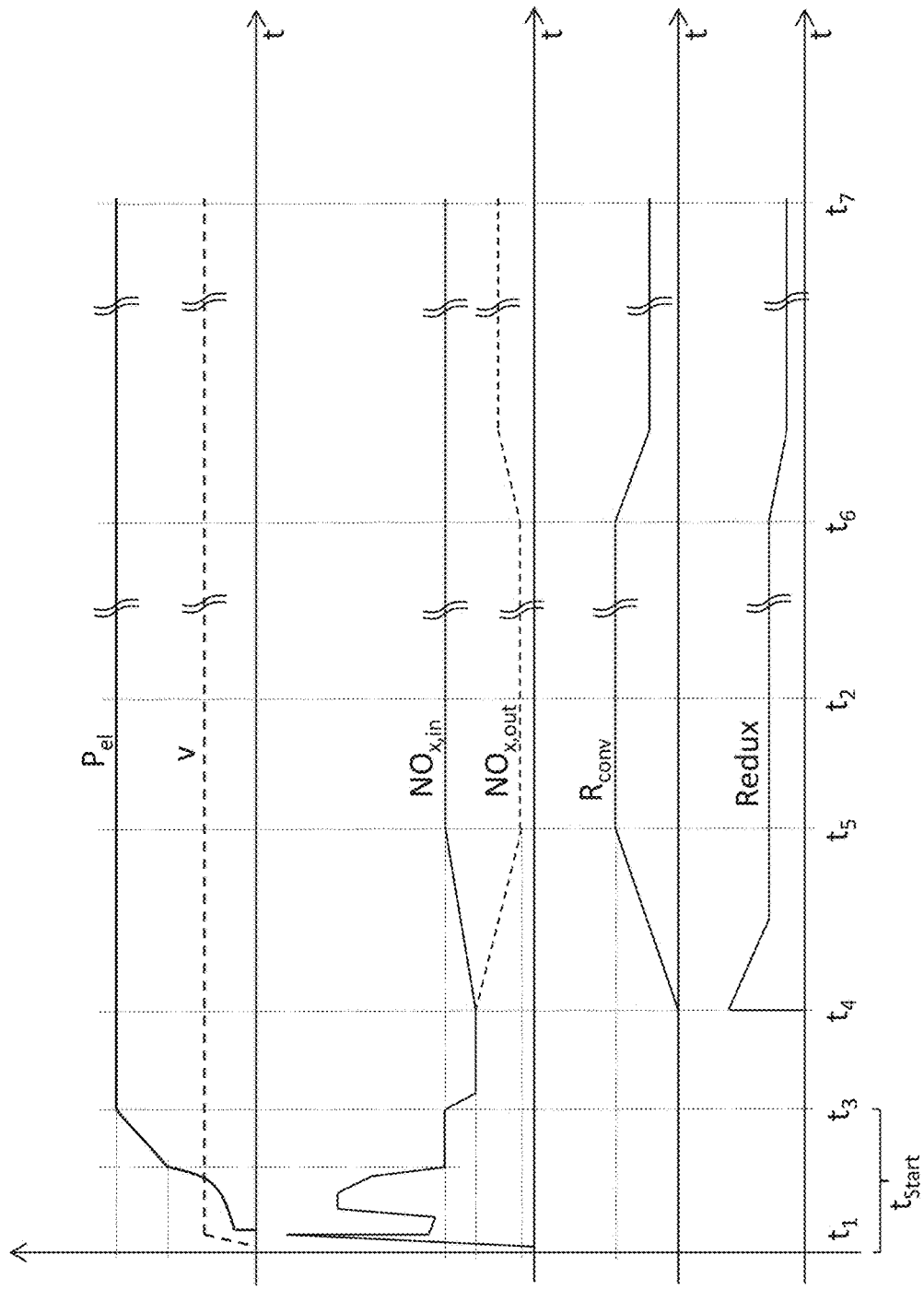
FIG. 2 shows a view of the state of the internal combustion engine in relation to time on the basis of selected parameters.

FIG. 2 shows a typical operating situation in relation to the FIG. 1 embodiment of an internal combustion engine 1 according to the invention, the starting point here being a start of the internal combustion engine 1 by actuating a start button at the moment in time $t_1$.

At the moment in time $t_3$, the internal combustion engine 1 has reached the nominal power output (here, in the form of an electrical nominal power output $P_{el}$ of a genset afforded by way of a coupled electric generator—not shown in FIG. 1 as it corresponds to the state of the art, but see FIG. 6), so that the following applies for the starting time: $t_{Start}=t_3-t_1$. The starting operation is therefore concluded at the moment in time $t_3$ (here, for example approximately 5 minutes).

Within the starting time $t_{Start}$ in relation to the $NO_x$ proportions or components occurring in the engine block 5 at $NO_{x,in}$ of the exhaust gases (the index "in" is adopted because this involves the $NO_x$ proportions or components flowing into the exhaust gas aftertreatment apparatus 16), it is possible to see two clear peaks, namely a first peak by virtue of the increase in the speed v to a nominal value (synchronous speed in relation to a power supply grid) and—after coupling of the genset to the power supply grid and the load uptake resulting therefrom—a second peak because of the build-up in torque during the turbo lag (which can be seen in the electrical power output as a divergence which remains behind the predetermined ramp). After overcoming the turbo lag (as soon as the turbocharger or turbochargers is or are brought up to speed), the $NO_x$ proportions or components $NO_{x,in}$ in the exhaust gases occurring in the engine block 5 fall to a first value which is constant for the rest of the starting time $t_{Start}$.

Figure 4:
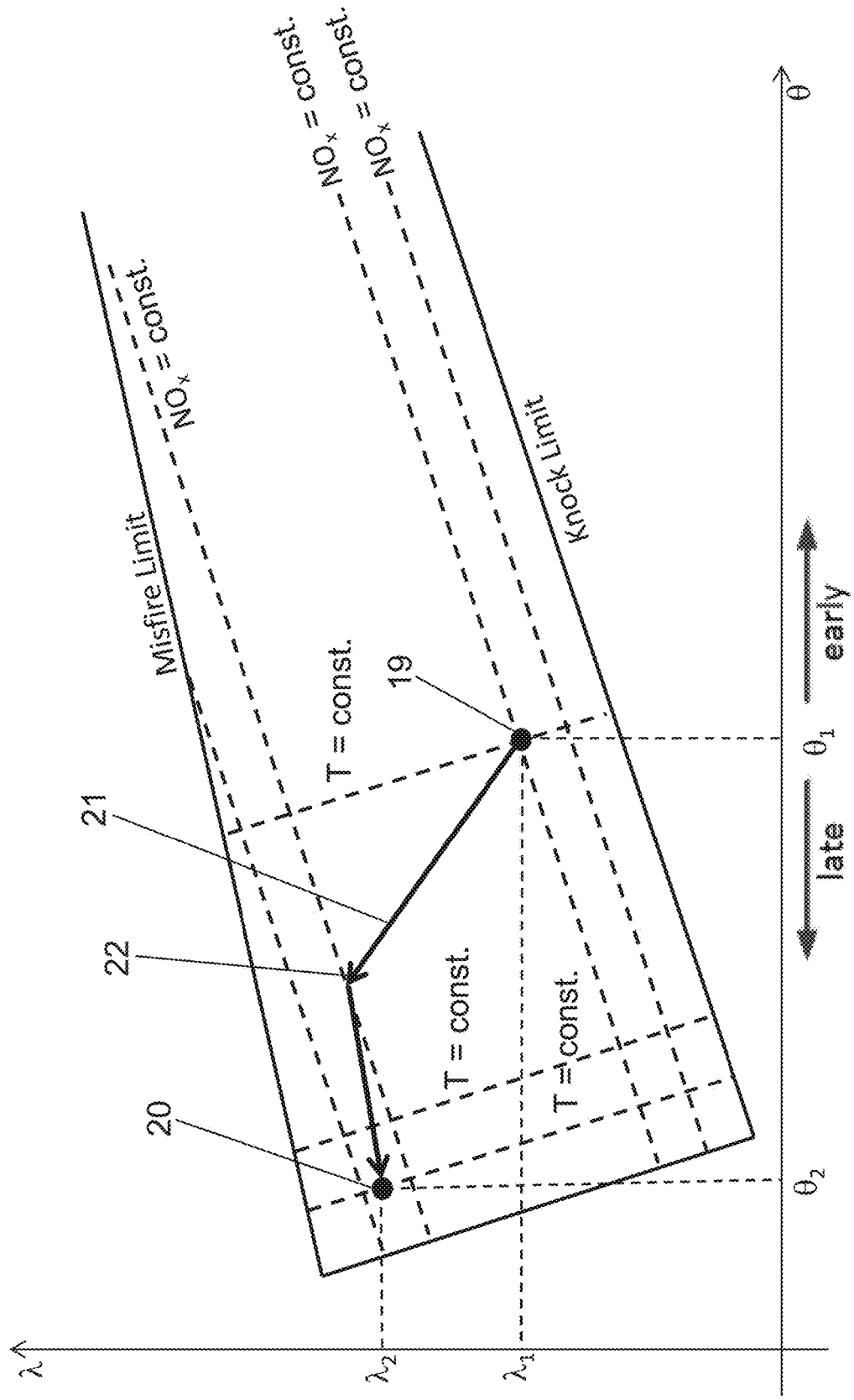
FIG. 4 shows an open-loop and closed-loop control movement of the operating point of the engine block in a combustion diagram.

The reduction in the $NO_x$ proportions or components $NO_{x,in}$ in the exhaust gases occurring in the engine block 5, that can be seen after the conclusion of the starting operation, is to be attributed to the fact that the engine closed-loop control unit 3 is configured, after the attainment of a nominal power output of the internal combustion engine 1, for a predetermined or predeterminable period of time, to increase a charging pressure of the engine block 5 and/or to set an ignition time of the ignition in the piston-cylinder units to late (see also the combustion diagram in FIG. 4).

The engine closed-loop control unit 3 monitors a conversion rate $R_{conv}(t)$ of the exhaust gas aftertreatment apparatus as an absolute value or—preferably—relative to an expected target value. The SCR catalytic converter 4 begins to work at the moment in time $t_4$ as the temperature necessary for reduction of the $NO_x$ in the catalytic zone is reached and reducing agent is injected with a mass flow Redux by the injection device 15 (controlled by the catalytic converter closed-loop control device 6) into the exhaust manifold 17. Therefore, the conversion rate $R_{conv}(t)$ begins to rise from the value zero, and the $NO_x$ proportions or components $NO_{x,out}$ of the exhaust gases at the discharge from the SCR catalytic converter 4 begin to diverge from the $NO_x$ proportions or components $NO_{x,in}$ (the expected target value of the conversion rate $R_{conv}(t)$ is first reached at the moment in time $t_5$).

As from the moment in time ta, the engine closed-loop control unit 3 begins to enrich the air-fuel mixture again and to set the ignition time back to earlier (see also the combustion diagram in FIG. 4). Therefore, the $NO_x$ proportions or components $NO_{x,in}$ increase again to the value at the moment in time $t_3$, this however can be accepted as now in fact the SCR catalytic converter 4 is working.

At the moment in time $t_2$, the predetermined period of time ta, (here, for example, 30 minutes) has expired and the $NO_x$ reference value $NO_{x,Ref}(t)$ for the catalytic converter closed-loop control device 6 has reached the predetermined target value $\overline{NO_{x,Tar}}$ (see FIG. 5).

The illustration, as from the moment in time $t_6$ (here, for example, 2 hours) to the moment in time $t_7$ (here, for example, 24 hours), shows by way of example that here a 24 hours—target value $\overline{NO_{x,Tar}}$ which is increased in relation to the 30 minutes—target value $\overline{NO_{x,Tar}}$ is accepted in order to minimize a consumption of reducing agent.

FIG. 3 shows an optional control diagram in which the engine closed-loop control unit 3 of the internal combustion engine 1 in FIG. 1, to reduce the $NO_x$ proportion or component in the exhaust gases that is emitted during a starting time by the internal combustion engine 1, is additionally configured during the starting time $t_{Start}$ of the internal combustion engine 1 to predetermine a power output ramp (dotted line which covers over a long period of time with the solid line) for the engine block 5 (here, for the electrical power output $P_{el}$) in a first time portion, preferably after reaching a minimum power output (moment in time $t_8$) until reaching a predetermined limit value for the power output (moment in time $t_{11}$) with a first lesser gradient and in a second time portion (from the moment in time $t_{11}$) until reaching a nominal power output of the internal combustion engine 1 (at the moment in time $t_3$) with a second greater gradient, wherein it is preferably provided that the second greater gradient is calculated in dependence on the remaining time (period $t_3$–$t_{11}$) until the starting time $t_{Start}$ is reached.

The solid line represents the actual power output. It can be seen that the engine block 5 can follow the power output ramp only after overcoming the turbo lag, which occupies the greatest part of the period of time $t_9$–$t_8$.

A power ramp is shown in dashed-line form without the optional control scheme, and it can be seen that from the outset a steeper power output ramp is adopted, which during the turbo lag leads to increased $NO_x$ emissions, which as from the moment in time $t_9$ would have to be compensated by a drop in the power output ramp in order to be able to reach the predetermined $NO_x$ average value $\overline{NO_x}$ of the $NO_x$ proportion or component of the exhaust gas for the period of time $t_{av}$.

FIG. 4 shows a combustion diagram in which it can be seen that the engine closed-loop control unit 3 of the internal combustion engine 1 in FIG. 1 is optionally configured to move a current first operating point 19 of the engine block 5, which occurs after attainment of a nominal power output of the internal combustion engine 1, to a transient operating point 20 with lower $NO_x$ emissions (the $NO_x$ emissions occurring in the engine block 5, for which straight lines involving constant values are shown, decrease upwardly in FIG. 4), for example, to an operating point at higher temperatures (the temperatures of the piston-cylinder units, for which straight lines involving constant values are shown, increase towards the left in FIG. 4), of the exhaust gases immediately after exhaust valves of the piston-cylinder units (preferably in that respect the temperature T of the hottest piston-cylinder unit is used by the engine closed-loop control unit 3). That can be achieved for example by adjusting an ignition time of ignition in the piston-cylinder units to late and/or (preferably, at the same time, leaning of the fuel-air mixture available for combustion in the piston-cylinder units from the first value $\lambda_1$ to a second value $\lambda_2$ (naturally in such a way that no misfires or knocking occurs). In the combustion diagram (with the coordinate axes "air excess number" and ignition time measured at the "crankshaft angle $\theta$"), the operating point thereby moves within the knock limit and the misfire limit in the direction of higher exhaust gas temperatures.

That can optionally occur in a first step (along a first trajectory 21 in the combustion diagram) by means of a pre-control in order to cause rapid first adjustment of the operating point of the engine block 5. That can be followed in a second step (along a second trajectory 22 in the combustion diagram) by a control action in order to be able to more accurately select the ensuing transient operating point 20.

When the at least one SCR catalytic converter begins to reduce the $NO_x$ proportion or component in the exhaust gas (because the catalytic zone has reached the required temperature), the engine closed-loop control unit provides for open-loop and/or closed-loop control of the engine block in such a way that the current operating point moves away from the transient operating point back in the direction of the first operating point (preferably, on the same trajectory as for the movement from the nominal operating point to the steady-state operating point, but in the reverse direction) and reaches same.

FIG. 5 shows once again the most important above-discussed parameters in the course of time t. It can be clearly seen how the time-dependent $NO_x$ reference value $NO_{x,Ref}(t)$ increasingly approaches the predetermined target value $\overline{NO_{x,Tar}}$ and finally reaches it at the time $t_2$ (right-hand dark point). By way of example, shown for an earlier time (left-hand dark point) in a shape with a gray background are rectangles which correspond to the average $NO_x$ proportions or components in the exhaust gases, that have already been emitted by the internal combustion engine 1 up to that moment in time, and the average $NO_x$ proportions or components in the exhaust gases, that are thus still available to reach the predetermined target value $\overline{NO_{x,Tar}}$.

With reference to FIG. 3, the synchronization duration is measured (here equal: $t_8-t_1$) and in dependence on the synchronization duration it is decided (immediately after the moment in time $t_5$) whether the mixture is to be more or less greatly enriched, and therefore a desired air excess number $\lambda$ is established in dependence on the synchronization duration.

LIST OF REFERENCES 1 internal combustion engine
2 piston-cylinder units
3 engine closed-loop control unit
4 SCR catalytic converter
5 engine block
6 catalytic converter closed-loop control device
7 discharge of the SCR catalyst
8 electric generator
9 turbocharger
10 wastegate
11 ignition device
12 $NO_x$ sensor
13 temperature sensor
14 oxidation catalytic converter
15 injection device for reducing agent
16 exhaust gas aftertreatment apparatus
17 exhaust manifold
18 charging air temperature control device
19 first operating point
20 transient operating point
21 first trajectory in the combustion diagram
22 first trajectory in the combustion diagram
23 power supply grid
24 mechanical coupling between internal combustion engine and electric generator
$t_{av}$ predetermined or predeterminable period of time
$t_1, t_2, t_3, \ldots$ first, second, third ... moment in time
t current moment in time
$t_{Start}$ starting time of the internal combustion engine
$NO_x(t)$ rate of the $NO_x$ proportion or component (mass flow or concentration) at the moment in time t
$\overline{NO_x}$ $NO_x$ average value
$\overline{NO_{x,Tar}}$ predeterminable or predetermined (constant) target value
$NO_{x,Ref}(t)$ time-dependent $NO_x$ reference value (mass flow) at the moment in time t
cumul$NO_2$ cumulated $NO_x$ proportion or component
$R_{conv}(t)$ conversion rate of the exhaust gas aftertreatment apparatus at the moment in time t
$NO_{x,in}(t)$ mass flow entering the exhaust gas aftertreatment apparatus at the moment in time t
$NO_{x,out}(t)$ mass flow issuing from the exhaust gas aftertreatment apparatus at the moment in time t
Redux(t) mass flow of reducing agent at the moment in time t
$\lambda$ air excess number
$\lambda_1$ first value of the air excess number
$\lambda_2$ second value of the air excess number
$P_m$ mechanical power output of the internal combustion engine
$P_{el}$ electrical power output of the internal combustion engine
V speed of a crankshaft of the engine block
T temperature
$\theta$ crankshaft angle

The invention claimed is:

1. A system having exhaust gas emissions control for an internal combustion engine, comprising:
a controller configured to:
set a target emissions value, for an emissions average value of an exhaust emissions portion of an exhaust gas produced by one or more piston-cylinder assemblies of the internal combustion engine, to achieve in relation to a period of time at a discharge from an exhaust gas aftertreatment apparatus having at least one catalytic converter; and
calculate an emissions reference value at a plurality of times during the period of time, wherein the emissions reference value is at least based on an already emitted amount of the exhaust emissions portion and the target emissions value during the period of time, wherein the emissions reference value is an emissions setpoint value selected to achieve the target emissions value by an end of the period of time, wherein the emissions reference value varies during the period of time, and the period of time occurs during a transient operating mode of the internal combustion engine.

2. The system of claim 1, wherein the period of time occurring during the transient operating mode of the internal combustion engine comprises a startup period of the internal combustion engine, a power ramp period having a power output ramp toward a nominal power output of the internal combustion engine, a load change period having a change in load on the internal combustion engine, or a combination thereof.

3. The system of claim 1, wherein the exhaust emissions portion at least relates to $NH_3$ associated with an amount of a reducing agent, or the at least one catalytic converter comprises an ammonia slip catalytic converter (ASC).

4. The system of claim 1, wherein the emissions reference value decreases over the period of time.

5. The system of claim 1, wherein the controller is configured to calculate the emissions reference value continuously or repeatedly for the plurality of times during the period of time at least in one operating mode.

6. The system of claim 1, wherein the controller comprises an engine controller configured to control operation of the internal combustion engine, wherein the engine controller is configured to provide the emissions reference value to a catalytic converter controller of the exhaust gas aftertreatment apparatus as the emissions setpoint value.

7. The system of claim 6, wherein the controller is a common controller having the engine controller and the catalytic converter controller.

8. The system of claim 1, wherein the controller is configured to, at least after an expiration of a starting time of the internal combustion engine, to control a current operating point of the internal combustion engine in dependence on a conversion rate of the exhaust gas aftertreatment apparatus.

9. The system of claim 1, wherein the controller is configured to move a current operating point of the internal combustion engine away from a first operating point to a transient operating point with a lower amount of the exhaust emissions portion if the at least one catalytic converter of the exhaust gas aftertreatment apparatus reduces less of the exhaust emissions portion than is required to attain the emissions reference value at the discharge of the exhaust gas aftertreatment apparatus.

10. The system of claim 1, wherein the controller is configured to, during a starting time of the internal combustion engine, reduce the exhaust emissions portion by at least setting a power ramp for the internal combustion engine in a first time portion, after a power output reaches a minimum power output, until the power output reaches a limit value with a first lesser gradient and in a second time portion until the power output reaches a nominal power output of the internal combustion engine with a second greater gradient, wherein the second greater gradient is calculated in dependence on a remaining time to reach the starting time.

11. The system of claim 1, wherein the controller is configured to, during a starting time of the internal combustion engine, reduce the exhaust emissions portion by at least increasing an air excess number ($\lambda$) of an air-fuel mixture for combustion in the internal combustion engine from a lower first value ($\lambda_1$) to a higher second value ($\lambda_2$).

12. The system of claim 1, wherein the controller is configured to control the exhaust emissions portion to control a charging pressure of the internal combustion engine to provide a desired air excess number ($\lambda$).

13. The system of claim 1, wherein the controller is configured not to exceed a limit value dependent on a mode of operation for a momentary mass flow or for a momentary concentration of the exhaust emissions portion of the exhaust gas in an exhaust manifold.

14. The system of claim 1, comprising the internal combustion engine.

15. The system of claim 14, comprising an electric generator coupled to the internal combustion engine.

16. A method having exhaust gas emission control for an internal combustion engine, comprising:
setting, a target emissions value, for an emissions average value of an exhaust emissions portion of an exhaust gas produced by one or more piston-cylinder assemblies of the internal combustion engine, to achieve in relation to a period of time at a discharge from an exhaust gas aftertreatment apparatus having at least one catalytic converter; and
calculating an emissions reference value at a plurality of times during the period of time, wherein the emissions reference value is at least based on an already emitted amount of the exhaust emissions portion and the target emissions value during the period of time, wherein the emissions reference value is an emissions setpoint value selected to achieve the target emissions value by an end of the period of time, wherein the emissions reference value varies during the period of time, and the period of time occurs during a transient operating mode of the internal combustion engine;
wherein setting and calculating are performed via a controller.

17. The method of claim 16, wherein the exhaust emissions portion comprises $NO_x$ emissions.

18. The method of claim 16, wherein the calculating comprises calculating the emissions reference value continuously or repeatedly for the plurality of times during the period of time at least in one operating mode.

19. The method of claim 16, comprising providing the emissions reference value to a catalytic converter controller of the exhaust gas aftertreatment apparatus as the emissions setpoint value.

20. A system having exhaust gas emissions control, comprising:
an internal combustion engine configured to produce an exhaust gas having an exhaust emissions portion;
an exhaust gas aftertreatment apparatus configured to treat the exhaust gas to lower an amount of the exhaust emissions portion; and
a controller configured to:
set a target emissions value, for an emissions average value of the exhaust emissions portion, to achieve in relation to a period of time at a discharge from the exhaust gas aftertreatment apparatus; and
calculate an emissions reference value at a plurality of times during the period of time, wherein the emissions reference value is at least based on an already emitted amount of the exhaust emissions portion and the target emissions value during the period of time, wherein the emissions reference value is an emissions setpoint value selected to achieve the target emissions value by an end of the period of time, wherein the emissions reference value varies during the period of time, and the period of time occurs during a transient operating mode of the internal combustion engine.

21. A system, comprising:
a controller configured to:
set a target value, for an emissions average value of an exhaust emissions portion of an exhaust gas produced by one or more piston-cylinder assemblies of an internal combustion engine, to achieve in relation to a period of time at a discharge from an exhaust gas aftertreatment apparatus having at least one catalytic converter; and
calculate an emissions reference value at least based on an already emitted amount of the exhaust emissions portion and the target value, wherein the emissions reference value is selected to achieve the target value by an end of the period of time;
wherein the controller is configured to, during a starting time of the internal combustion engine, reduce the exhaust emissions portion by at least setting a power ramp for the internal combustion engine in a first time portion, after a power output reaches a minimum power output, until the power output reaches a limit value with a first lesser gradient and in a second time portion until the power output reaches a nominal power output of the internal combustion engine with a second greater gradient, wherein the second greater gradient is calculated in dependence on a remaining time to reach the starting time.

* * * * *